Patented Oct. 15, 1935

2,017,428

UNITED STATES PATENT OFFICE 2,017,428

PROTECTION OF METAL SURFACES

John A. Almquist, Wilmington, Del., assignor, by mesne assignments, to E. I. du Pont de Nemours & Company, Wilmington, Del., a corporation of Delaware No Drawing. Application October 7, 1930, Serial No. 487,095

13 Claims. (Cl. 23—239)

This invention relates to the handling of ammonia at elevated temperatures and more particularly to the protection of metallic surfaces from corrosion or attack thereby.

Due to the wide application of the direct synthesis to the manufacture of ammonia, this material has in recent years been made available for use in an increasing number of industrial processes, many of which involve the handling of ammonia at elevated temperature with consequent difficulty from the activity of ammonia in attacking many of the common metals. Thus, ammonia is now a very convenient and economical source of hydrogen for many purposes. It can readily be decomposed into hydrogen and nitrogen by passage in the gaseous state and at an elevated temperature over a suitable catalyst. In the development of this method of gas generation, however, a serious practical problem has been the tendency of the hot gaseous ammonia to materially shorten the life of the apparatus used by corrosion of the metallic surfaces and walls thereof.

Ammonia is also widely used in the hardening of steel and ferrous alloys by heating the same to an elevated temperature in an atmosphere of ammonia. Here difficulty has been encountered in localizing and confining the desired nitriding action to only those parts which it is intended to harden. With the object of protecting portions of the treated metal from the hardening action of hot, gaseous ammonia, coatings of substances impervious to ammonia have been tried. Tin plate has been used, but as in similar processes the difficulty of removing the impervious coating after nitriding the desired parts has arisen.

It is, therefore, an object of the invention to provide an improved method for preventing corrosion or attack of metallic surfaces subject to the action of hot ammonia.

It is a further object of the invention to provide an improved form of corrosion resistant apparatus for handling hot ammonia.

These and other objects and advantages of the invention will be apparent by reference to the following specification in which the preferred embodiments are described.

I have discovered that an impervious coating is unnecessary for the protection of metallic surfaces from hot ammonia and that metals which would otherwise be attacked thereby, such, for example, as iron, nickel, cobalt, their alloys, and certain forms of copper, can be protected by means of a layer of a catalyst which is active for the decomposition of ammonia. Metals protected in this way can be subjected to hot ammonia for long periods without evidence of corrosion. Although the invention is not limited to any explanation or theory as to the modus operandi thereof, it would appear that its effectiveness is due to the fact that the ammonia which would otherwise attack the metallic surfaces is dissociated by the catalyst layer and similarly any nitrogen penetrating the porous catalyst lining reaches the metal surface only in the molecular and therefore inactive state.

The catalyst can most conveniently be applied to the metal surface in comminuted form. Inasmuch as the effectiveness of the protection is apparently due to intimate contact of ammonia with catalyst particles, the latter should be relatively small in size. Although the optimum size will vary depending upon specific conditions, generally speaking, the best results are obtained using particles in the range of 40–200 mesh.

The thickness of the protective layer may also be varied depending upon particular conditions, especially the temperature and pressure to which the protected parts are to be subjected. A layer at least $\tfrac{1}{16}$ in. thick is preferably used and in general it need not exceed ¼ in. in thickness to afford adequate protection.

While in many cases, as in nitriding large flat surfaces, it will be sufficient loosely to surround the metal surface with discrete particles of catalyst, in others, such as the protection of the walls of an ammonia-decomposing chamber, it may be necessary to have a relatively permanent and adherent protective coating. I have found in such circumstances that ease in application as well as freedom from danger of displacement of the catalyst layer can be obtained by means of a binding agent, for example, clay or sodium silicate, with which the catalyst may be mixed and thereafter applied to the desired parts. The binding material may be mixed with the catalyst in the form of a paste, applied to the surfaces to be protected, and baked. Or, as in the case of clay, the mixture may be applied dry and heated to a sintering temperature to form a relatively hard, adherent coating. The catalyst layer may be applied and retained on the metallic surfaces to be protected in many other ways, with or without a binding material. For example, in a cylindrical ammonia decomposition chamber a layer of finely divided catalyst may be applied to the metallic surface and retained in place by means of a high temperature resisting metallic gauze or screen, such as "Nichrome" wire of fine mesh.

For the best results in surface hardening operation, when the least contact of ammonia with surfaces not to be hardened will have an objectionable effect, it is advisable to subject the protective catalyst layer to activation by reduction with hydrogen or hydrogen-containing gases. On the other hand, in protecting parts of apparatus used in handling hot ammonia this preliminary activation may be dispensed with since ammonia itself is an effective reducing agent. In other words, the small amount of reaction with the surface which occurs while the catalyst is being reduced with ammonia is sufficient to cause a slight increase in weight and an increase in hardness, but is not sufficient to show visible evidence of corrosive attack.

The catalyst employed may be any catalyst active for the decomposition of ammonia, such as granular iron, obtained, for example, by the reduction of fused iron oxide, to which promoters, such as aluminum oxide, magnesium oxide and zirconium oxide may advantageously be added.

Although the invention is susceptible of various changes and modifications in putting it into practice, the following examples will indicate the preferred method of procedure as applied to the protection of the metallic surfaces of an apparatus for use in thermally decomposing ammonia, and to the nitriding of ferrous alloys with ammonia, respectively.

Example 1.—An iron catalyst made by adding 3% by weight of magnesium oxide and 3% by weight of aluminum oxide to pure molten ferroso ferrous oxide, cooling, and crushing to 60 mesh, is mixed to a thin paste with a sodium silicate solution and cast into a tube of 1½ in. mild steel pipe (black iron), twenty inches in length, using a tapered wooden core coated with paraffin. The catalyst mixture is tamped solidly in place with an ⅛ in. rod. After setting about two hours the wooden roller is withdrawn and a uniform lining of about $\frac{3}{16}$ths of an inch thickness is left in the tube. The tube is then placed in an electric furnace and dried by heating gradually to about 600° C. over a period of two hours and then maintained at a temperature of 600–800° C. for a period of one-half hour whereby the lining is baked into place.

A tube prepared as above was heated at a temperature of from 550° C. to 600° C. while approximately six cubic feet per hour of ammonia was passed through it. At the end of 504 hours of continual operation the catalyst lining was in good physical condition and the tube unattacked throughout its entire length.

Example 2.—A piece of "Nitralloy" steel, ¾ inch in length, ½ inch in width, and ⅝ inch in thickness was placed in an externally heated iron tube 1½ inches in diameter, the alloy being surrounded to a depth of about ¼ inch by a loose layer of a 200 mesh iron catalyst prepared as in Example 1. Hydrogen was then passed for 2½ hours through the tube at a temperature of 510° C. to thoroughly activate the catalyst. The tube was heated to 550°–600° C. while approximately six cubic feet per hour of ammonia was passed through it. At the end of 48 hours of continual operation the catalyst layer was in good physical condition, the specimen of steel was unattacked throughout its entire surface and showed a hardness of 165 (Brinnell) obtained compared with an original hardness of 172. Under identical conditions a piece of the same 'Nitralloy" steel, not protected by catalyst, was found to be considerably attacked and to have a hardness of 447.

Various changes may be made in the method described without departing from the invention or sacrificing any of the advantages thereof.

I claim:

1. In a process involving the handling of hot gaseous ammonia the method of affording protection to metallic surfaces subject to attack by hot gaseous ammonia which comprises covering said surfaces with an ammonia-decomposing catalyst.

2. In a process involving the handling of hot gaseous ammonia the process of affording protection to metallic surfaces subject to attack by hot gaseous ammonia which comprises covering said surfaces with an iron oxide ammonia-decomposing catalyst and subjecting said catalyst to reduction with hydrogen.

3. In a process involving the handling of hot gaseous ammonia the method of affording protection to metallic surfaces subject to attack by hot gaseous ammonia which comprises applying to said surfaces a coating containing an ammonia-decomposing catalyst and a binding material.

4. In a process involving the handling of hot gaseous ammonia the method of affording protection to metallic surfaces subject to attack by hot gaseous ammonia which comprises applying to said surfaces a coating containing an ammonia-decomposing catalyst and sodium silicate.

5. In a process involving the handling of hot gaseous ammonia the method of affording protection to metallic surfaces subject to attack by hot gaseous ammonia which comprises applying to said surfaces a coating containing an iron oxide ammonia-decomposing catalyst and sodium silicate and subjecting said coating to activation by reduction with hydrogen.

6. In a process involving the handling of hot gaseous ammonia the method of affording protection to metallic surfaces subject to attack by hot gaseous ammonia which comprises applying to said surfaces an adherent coating of ammonia-decomposing catalyst.

7. In a process involving the handling of hot gaseous ammonia the method of affording protection to metallic surfaces subject to attack by hot gaseous ammonia which comprises coating said surfaces with a mixture of a catalyst active for the decomposition of ammonia and a binding material.

8. An apparatus for handling hot gaseous ammonia in which metallic surfaces subject to attack by hot ammonia are provided with a protective layer of catalyst active for the decomposition of ammonia.

9. In a process of nitriding ferrous materials by contact with hot ammonia, the step of protecting metallic surfaces not to be nitrided which comprises covering said surfaces with an ammonia-decomposing catalyst.

10. The process of affording protection to metallic surfaces subject to attack by hot gaseous ammonia which comprises covering said surfaces with a comminuted ammonia-decomposing catalyst.

11. The process of affording protection to metallic surfaces subject to attack by hot gaseous ammonia which comprises covering said surfaces with a comminuted ammonia-decomposing catalyst, and subjecting said catalyst to reduction with hydrogen.

12. In a process of nitriding ferrous materials with hot ammonia the step of protecting metallic surfaces not to be nitrided which comprises covering said surfaces with a comminuted ammonia-decomposing catalyst.

13. In a process of nitriding ferrous materials with hot ammonia the step of protecting metallic surfaces not to be nitrided which comprises covering said surfaces with a comminuted ammonia-decomposing catalyst, and subjecting said catalyst to reduction with hydrogen.

JOHN A. ALMQUIST.